July 12, 1949.　　　　　L. A. DICKENS　　　　　2,475,700
HYDRAULIC CLUTCH
Filed March 5, 1946　　　　　　　　　　　　　　3 Sheets-Sheet 1
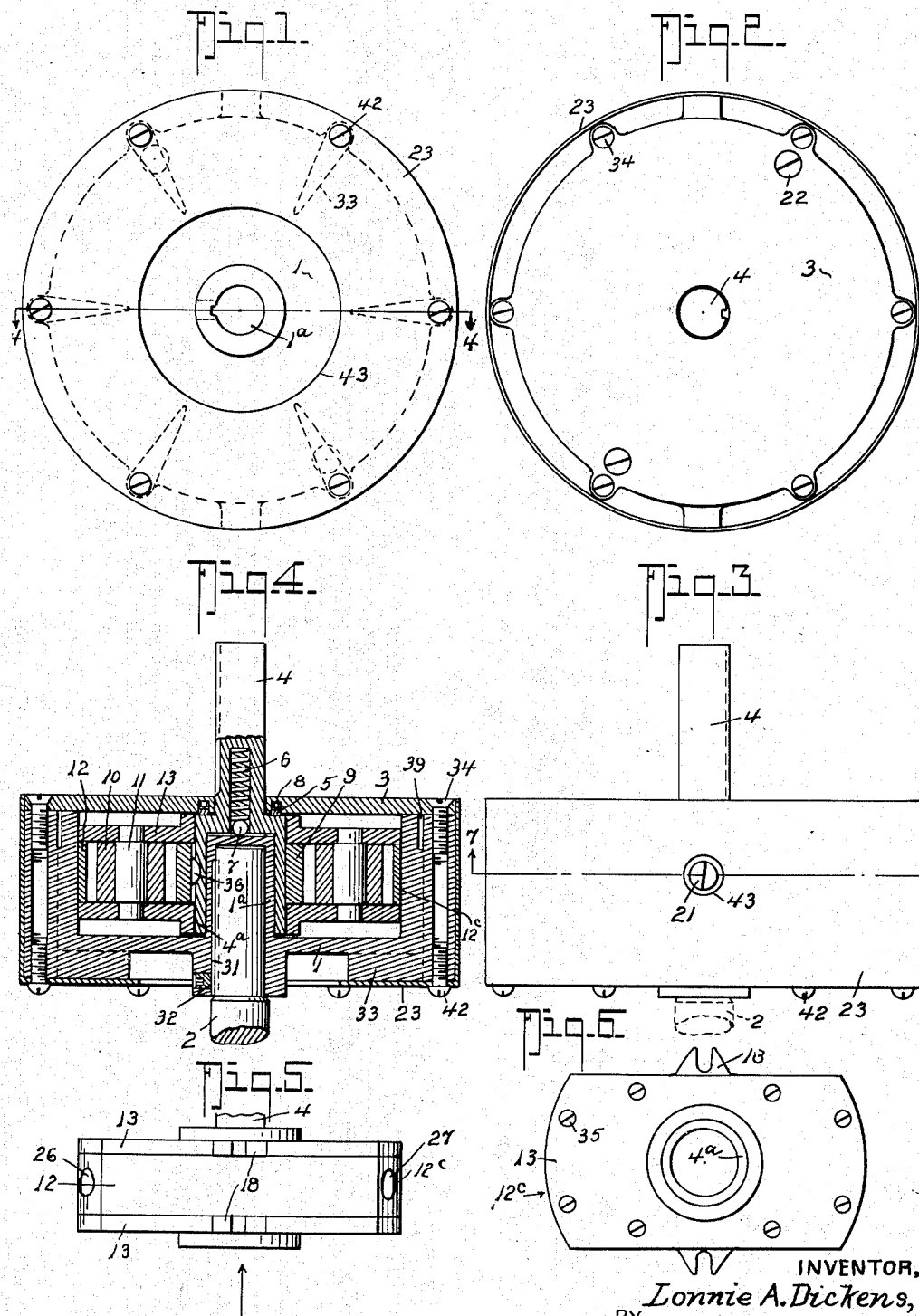
INVENTOR.
Lonnie A. Dickens,
BY Albert E. Dietrich,
ATTORNEY.

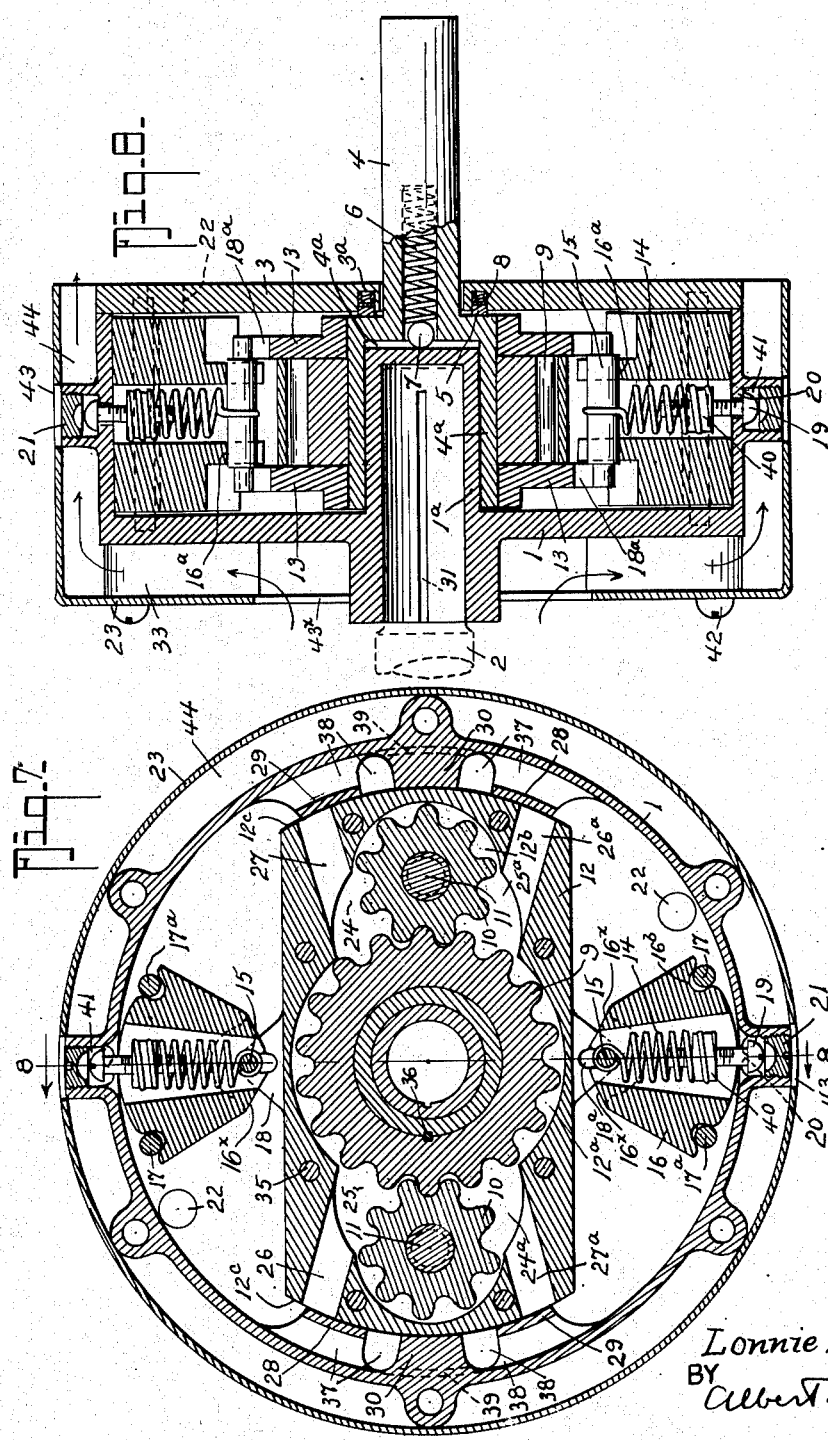

July 12, 1949.　　　　　L. A. DICKENS　　　　　2,475,700
HYDRAULIC CLUTCH
Filed March 5, 1946　　　　　　　　　　　　　　3 Sheets-Sheet 3
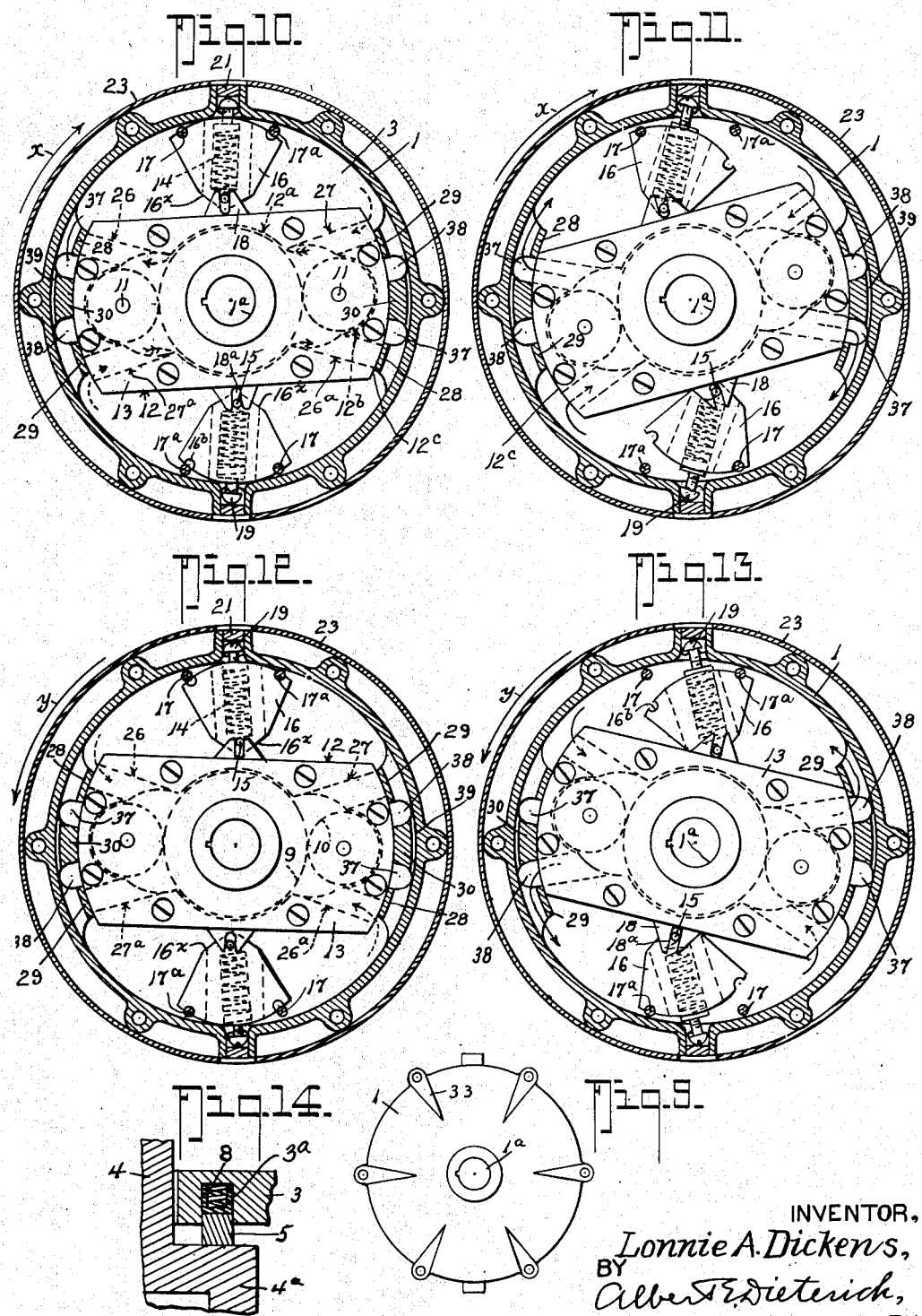
INVENTOR,
Lonnie A. Dickens,
BY
Albert E. Dieterich,
ATTORNEY Patented July 12, 1949

2,475,700

UNITED STATES PATENT OFFICE 2,475,700

HYDRAULIC CLUTCH

Lonnie A. Dickens, High Point, N. C.

Application March 5, 1946, Serial No. 652,143

13 Claims. (Cl. 192—61)

My invention is a new and useful self-reversing, centrifugally controlled, adjustable self-cooling, hydraulic torque-limiting clutch.

The invention has for its objects:

1. To provide a clutch for the purpose of connecting any rotating prime mover to its driven load so as to disengage the load during the starting period of the prime mover.

2. To provide a clutch which will slip and allow the load to operate at reduced speed or stop altogether if the load exerts more torque than that for which the clutch is adjusted.

3. To provide a clutch which reduces the torque transmitting capacity as the speed of the prime mover is reduced.

4. To provide a clutch which will automatically reverse itself upon change in the direction of rotation of the prime mover and develop the same torque in either direction.

5. To provide a clutch embodying the foregoing features which is automatically air cooled.

Other objects will in part be obvious and in part be pointed out hereinafter.

To the attainment of the aforesaid objects and end invention further resides in those novel details of construction, combinations and arrangements of parts, all of which will first be fully described hereinafter and then be specifically pointed out in the appended claims, reference being had to the accompanying drawings in which:

Fig. 1 is an elevation of the clutch looking at the prime mover side of the clutch.

Fig. 2 is an elevation of the side opposite that shown in Fig. 1.

Fig. 3 is a plan view of the clutch.

Fig. 4 is a horizontal section on the line 4—4 of Fig. 1.

Fig. 5 is a top plan view of the pump unit.

Fig. 6 is an elevation of the same looking in the direction of the arrow in Fig. 5.

Fig. 7 is an enlarged vertical section on the line 7—7 of Fig. 3.

Fig. 8 is a vertical cross section on the line 8—8 of Fig. 7.

Fig. 9 is an elevation similar to Fig. 1 with the shield removed.

Figs. 10 and 11 are views similar to Fig. 7 on a reduced scale and illustrating the operation of the clutch when the driving shaft is turned in one direction, the pump and the governor weights being shown in elevation.

Figs. 12 and 13 are views similar to Figs. 10 and 11 illustrating the operation of the clutch when the driving shaft is turned in the reverse direction.

Fig. 14 is an enlarged detail view of a portion of the oil seal for the housing around the auxiliary shaft.

Even though there is a great need for a clutch of this kind on many applications, the prime purpose of my devising this clutch was for mounting on an electric motor when the motor is to be connected to some variable load such, for example, as a refrigeration or air compressor. When so used the clutch should be adjusted to permit a torque proper to absorb the full-load power of the motor when running at its rated speed. The load, which we may assume is an air compressor, should be belted or geared to the load side of the clutch in the proper ratio so that when operating at its lowest pressure it will utilize the full load torque of the motor without the clutch slipping and as the pressure increases, after starting, excessive torque will be exerted on the clutch and it in turn will slip and permit the compressor to slow down until the torque is no longer excessive. If the speed of the motor is reduced due to reduced power supply or other causes the clutch will in turn further limit the torque allowed. Ordinarily an over-sized motor is used in order to overcome starting inertia and to protect against increased load while operating. Since my clutch protects the motor against these overloads a motor of proper power can be used and therefore will operate at its highest efficiency; also as the motor will always be running at its full load, a higher power factor will be maintained on the power line.

Having briefly outlined the essential features of my new clutch reference is now made to the accompanying drawings in which 1 indicates a housing that is rigidly mounted on a shaft 2 by means of a key 31 and a set screw 32 (see Fig. 4). The shaft 2 is the driving shaft of the motor or other prime mover which is used to drive the load through the medium of my new clutch. The shaft 2 per se is not of my invention. The housing 1 is provided with a cover plate 3 that is secured in place by counter sink screws 34 in an oil tight manner.

An auxiliary shaft 4 extends through an opening in the cover plate 3 into the housing where it has an enlargement 4ᵃ and a bore 4ᵇ into which bore the hub 1ᵃ of the housing fits. The shaft 4 is firmly held against a seal washer 5 by a spring 6 acting against the hub 1ᵃ via a ball 7. Seal washer 5 is fitted into a recess 3ᵃ in cover plate 3 with a resilient gasket 8 back of it.

This construction permits shaft 4 to turn inside the opening in plate 3 and still maintains an oil-tight enclosure.

A gear type pump floats freely on the internal portion 4ª of the shaft 4. The pump comprises a body 12 having removable sides 13 held in place with counter-sunk screws 35 (see Fig. 6). A large gear 9 is keyed at 38 to the portion 4ª of the shaft 4 and meshes with two smaller gears 10 that are mounted on shafts 11, which shafts are carried by the side plates 13. The body 12 is chambered so that the walls of the chamber at 12ª and 12ᵇ conform to the curvature of the gears and is further chambered as at 24, 24ª and 25, 25ª. Ports 26, 26ª lead from chambers 25, 25ª to the periphery 12ᶜ of the pump body 12 while ports 27, 27ª lead from chambers 24, 24ª to the said periphery.

The housing 1 is provided with inner projections 28, 29 and 30 and passages 37, 38 and 39, the inner faces of the projections 28, 29 and 30 being circular in side view to conform to the circular surface of the peripheries 12ᶜ, as clearly shown in Fig. 7.

The side plates 13 of the pump body 12 have diametrically opposite lugs 18 which have slots 18ª to receive the ends of pins 15 to which one end each of two coil springs 14 are attached. The other ends of springs 14 are attached to blocks 40 which are bored and tapped for adjusting screws 19 whose heads rest on knife-edge projections 20 in apertures 41 which are closed by screw plugs 21.

As shown in Fig. 7, the pump assembly is held in the central position by the force of the springs 14 acting through the pins 15 against governor weights 16. The weights 16 are held, by the springs 14, firmly against the perimeter of the housing 1, the pins 15, being mounted in slots or apertures 16ª (see Fig. 8) in the weights 16. The tension on springs 14 is adjustable by means of the screws 19 before referred to. The weights 16 have recesses 16ᵇ to pivotally engage with fixed pins 17, 17ª held in recesses in the housing and cover plate 3 for a purpose hereinafter made clear. The springs 14 and weights 16 and associated parts constitute the driving connection between the casing or housing 1 and the pumping unit.

After assembling the housing 1, covers 3 and structures within the housing the spaces within the housing and pump assembly are filled with oil through either of the openings provided by removal of plugs 22. Two plugs 22 are provided at opposite sides of the plate 3 to simplify draining and replacement of the oil when necessary.

A shield 23 is secured to the housing 1 by screws 42 and encloses part of one side and the periphery of the housing, except for openings 43 provided for access to the plugs 21. The central portion of the face of the shield 23 is provided with an air intake opening 43ˣ to cooperate with the vanes 33 and the transverse passages 44 through which air is forced by the rotation of the clutch housing 1 as will later more fully appear.

Operation

The operation of the clutch as illustrated in Figs. 7, and 10 to 13 inclusive, is as follows: Starting with the parts at rest (Fig. 7) when shaft 2 of the prime mover starts to turn it carries with it the housing 1. Assuming that they are rotating in a clockwise direction as indicated by the arrow x in Figs. 10 and 11, the pump assembly will tend to stand still or lag behind the housing due to the flexible connection between the housing and the pumping assembly and due to the fact that the pump assembly is mounted on the hub of shaft 4 and as shaft 4 will be restrained by the inertia of the load connected to shaft 4 (the load will be connected to shaft 4 in the same way in which it would otherwise have been connected to shaft 2), the pump assembly will move (relatively) to the position shown in Fig. 10. The pump assembly will be temporarily restrained in this position as at this time weights 16 firmly contact the pins 17. Even though the pump assembly is held at this point in relation to the housing 1 and turns with the housing, gear 9 is still restrained by the load acting through the shaft 4 and therefore may be considered as revolving in relationship to the pump assembly and the housing.

As the clutch is assumed to be revolving in a clockwise direction and the load driven by shaft 4 has not yet started to rotate, in order to simplify the explanation of the action of pump shaft 4 together with gear 9, gear 9 will be considered as rotating in a counter-clockwise direction, as it actually is in relation to the clutch assembly. Gear 9 will carry the oil which is enclosed in and around the pump from pump chamber 24 to chamber 25 and from chamber 24ª to chamber 25ª. Since gears 10 are in mesh with gear 9 they are driven by gear 9 in the opposite directions and therefore carry oil from chambers 24ª and 24 respectively to chambers 25 and 25ª. This oil is carried in the vacant spaces between the teeth of the gears and as the teeth of gears 9 and 10 mesh where they contact no space is provided to carry the oil further than chambers 25, 25ª and the only outlets to chambers 25, 25ª, except around the gears 9 and 10 are the ports 26, 26ª. The only openings to chambers 24, 24ª are ports 27, 27ª.

As the ports reach the position indicated in Fig. 10, ports 26, 26ª are closed by projections 28 of housing 1 and as ports 27, 27ª are moved away from projections 29 the ports 27, 27ª are opened, thereby permitting oil to be drawn into chambers 24, 24ª and be carried from there by the gears to chambers 25, 25ª from which the oil cannot escape. As the oil cannot escape the gears of the pump "lock" and therefore cease to turn in relation to the pump assembly. Thus the pump assembly tends to be restrained by the shaft 4 and therefore also rotates in relation to the housing 1 and thus reaches a position illustrated in Fig. 10. If the torque necessary to turn the load connected to shaft 4 is not great enough to overcome the adjusted tension of springs 14 which would not overload the motor, the pump assembly would remain as shown in Fig. 10 and consequently shaft 4 would be carried around at the same speed as shaft 2 and housing 1.

Assuming that the load is sufficient to draw pump assembly to position of Fig. 11 (at which time the flat surfaces 16ˣ of the weights 16, by engagement with the adjacent surfaces of the pump body 12, serve to limit the rocking movement of the weights in a clockwise direction in Fig. 11), then ports 26, 26ª will register with passages 37 through which the oil from chambers 25, 25ª may escape, thereby permitting gears 9 and 10 to turn in relation to the pump and permit shaft 4 and the load to slow down or stop relative to shaft 2.

As the clutch assembly gains speed the weights 16 tend to move back toward the perimeter of the housing 1 by their own centrifugal force which supplements the force exerted by the tension of springs 14. It will be noted that when the clutch assembly is not revolving only the force of springs 14 is available to hold the inner pump assembly near the center position, but when revolving the force of the weights 16 is added, which force increases as the speed increases, thus more power is applied to the pump assembly and this assembly will be gradually drawn from the position shown in Fig. 11 back toward the position shown in Fig. 7. As the pump assembly is drawn toward the position of Fig. 7, ports 26, 26ª are moved in relation to passages 37 and thus partly close the oil outlets from the pump, consequently the gears of the pump will be slowed down in their relation to the pump and housing 1. This action causes shaft 4, driven by gear 9, to start to turn with housing 1. If the load, driven through shaft 4, exerts more torque through shaft 4 and gear 9 against the pump assembly than the combined forces of weights 16 and the adjusted tension of springs 14, then the pump assembly will be held in an off-center position, permitting the openings from ports 26, 26ª to passages 37 to be partially open. This permits some oil to pass thus permitting gears of the pump assembly to turn slowly in relation to housing 1, which in effect is the clutch "slipping" to allow the driven load to slow down until it does not produce excessive torque. If, however, the load does not produce enough torque to overcome the force of springs 14 and weights 16, the pump will be moved to the position of Fig. 10 and since the passage of oil from the pump is blocked in this position the clutch assembly does not slip and consequently carries the driven load of shaft 4 at the same speed as that of the prime mover shaft 2.

In view of the foregoing it will be noted that in Fig. 10 the clutch is "engaged" and driving the load. In Fig. 11 the clutch is "disengaged" and permits the load to stand although the power supply is rotating. It will be further noted that the clutch can operate at any position between these two positions, thus allowing the load to "slip" just the amount necessary to balance with adjustments of springs 14 and centrifugal force of weights 16. The clutch will be permitted to "slip" more at starting or at reduced speeds as then the force of weights is less.

When the weights 16 reach the positions of Fig. 10, centrifugal force no longer acts upon them as they then roll against the perimeter of the housing 1 instead of pivoting on pins 17. The springs 14 also exert no restraining force on the pump assembly at this point since they are kept from contracting further by the weights 16 as pins 15, to which the springs are attached, are held in the center of the radius of the weights 16.

Inasmuch as no restraining force is exerted against the pump assembly when it reaches the position of Fig. 10, this pump can rotate freely from this position through neutral position of Fig. 7, to reversed position as shown in Fig. 12. This movement is controlled only by the friction of shaft 4 as it "slips" or rotates in the clutch assembly. Thus when the clutch is moved in either direction, the "slip" of the driven shaft 4 adjusts the clutch for that direction of operation. As for example, if the clutch were to be rotated in a counter-clockwise (reversed) direction as indicated by the arrows y in Figs. 12 and 13, the internal mechanism will follow exactly the same procedure as previously described, except in reverse order, as shown in Figs. 12 and 13, i. e. weights 16 will now pivot on pins 17ª instead of pins 17 and ports 27, 27ª will coincide with passages 38 instead of ports 26, 26ª with passages 37, as in this direction pump gears 9 and 10 will operate opposite and consequently will pump oil in a reversed manner to that previously described.

When the clutch is "slipping" as shown in Fig. 11, oil will be drawn into the pump through the ports 27, 27ª and discharged from ports 26, 26ª into the passages 37 and from there will circulate around the perimeter of housing 1 and back into ports 27, 27ª. When the clutch is "slipping" in counter-clockwise rotation as shown in Fig. 13, the order will be reversed and oil will be drawn into the pump through ports 26, 26ª and discharged from ports 27, 27ª, through passage 38 and then back to ports 26, 26ª. Passages 37 and 38 are connected by a small opening 39 through which a small portion of the oil will be circulated, but the chief function of the opening 39 is to allow an equal amount of oil to be distributed to each side of the pump within the clutch assembly in the event that the enclosure was not filled completely with oil. In this case the oil would naturally gravitate to the side which happened to stop at the bottom; immediately upon starting to rotate centrifugal force will overcome gravity and the oil would distribute itself evenly around the perimeter of housing 1, thus balancing the clutch.

As the oil is pumped around inside the housing 1 it becomes heated by friction and as the oil circulates in close contact with housing 1 the heat is transmitted to the housing. To dissipate the heat and prevent it from becoming excessive the housing is provided with vanes 33 which serve as blades for circulating air and as fins for transmitting the heat from the housing to the air circulated. Shield 23 encloses the outside diameter of the housing 1 and covers the vanes 33 to which the shield is secured by the screws 42. Thus the vanes, in combination with the shield 23, become a centrifugal fan.

When the clutch assembly is turning the air within the space between vanes 33 enclosed by shield 23, revolves with it and is thrown toward the periphery of the shield and consequently causes more air to be drawn in through the center opening 43, causing air to circulate into shield 23 and around vanes 33 and housing 1 as indicated by arrows in Fig. 8.

If desired the weights 16 and pins 17, 17ª may be omitted and pins 15 anchored to the lugs 18. A clutch so constructed would operate in the same way as that shown and heretofore described, except that it would be only responsive to torque and not be at all controlled by speed.

From the foregoing description taken in connection with the accompanying drawings it is thought the construction, operation and advantages of my invention will be clear to those skilled in the art to which it appertains.

What I claim is:

1. In a clutch of the class described a drive housing having a chamber; a driven shaft having a portion located within said chamber and a portion projecting to the outside of said housing for coupling to a load; a pump unit within said housing chamber and including a pump casing mounted for limited rotation on said driven shaft; means continuously tending to hold said pump unit in a balanced position in said housing chamber, said pump unit including fluid circulating instrumentalities operatively connected to said driven shaft and to said housing; and a hydraulic liquid within said housing chamber and within said pump unit for cooperation with the same substantially as shown and described.

2. In a hydraulic clutch of the class described, a housing enclosing a chamber and having a hub in part at least located in said chamber and adapted to receive and be connected to a driving motor shaft; a driven shaft having a portion located within said chamber and bearing on said hub; a gear-type pump journalled for limited rotation on said driven shaft within said chamber and having a master gear keyed to said driven shaft, said pump including oil inlet and discharge ports; said housing having oil inlet and outlet passages for cooperation with said oil ports of said pump; yieldable means connecting said housing with said pump for continuously tending to balance the pump in a predetermined normal position; and oil in said pump and said chamber; all being arranged substantially as shown and described.

3. The clutch of claim 2 wherein said yieldable means comprises rocking weights at diametrically opposite sides of said pump, coil springs cooperatively associated with said weights and means to limit the rocking movement of said weights.

4. In a clutch of the class described, a rotatable housing having a chamber provided with internal projections having cylindrical segment faces and provided with fluid circulating passages and an internal hub; a gear-type pump unit having cylindrical faces to cooperate with said projections and having inlet-outlet ports cooperating with said fluid circulating passages; a driven shaft journalled in part in said casing and on which shaft said pump unit turns and is operatively connected; and torque limiting means operative between said housing and said pump unit.

5. In a clutch of the class described, a rotatable housing having a chamber provided with internal projections having cylindrical segment faces and provided with fluid circulating passages and an internal hub; a gear-type pump unit having cylindrical faces to cooperate with said projections and having inlet-outlet ports cooperating with said fluid circulating passages; a driven shaft journalled in part in said casing and on which shaft said pump unit turns and is operatively connected; and centrifugally controlled torque limiting means operatively connecting said housing and said driven shaft and including said pump.

6. A clutch of the class described which includes a rotatable motor-driven housing enclosing a chamber with an annular wall provided with diametrically opposite projections having liquid passages and having annular faces; a driven shaft for connection to a load and in part being journalled within said chamber; a gear-type pump unit mounted for limited rotation on said driven shaft and having end faces registering with the faces of said projections and being provided with liquid circulating ports for cooperation with said liquid passages when in register therewith; yieldable means continuously tending to hold said ports out of register with said liquid passages; said pump unit including pumping gears one of which is secured to said driven shaft, said gears continuously tending to effect liquid circulation through said ports while said housing is being rotated.

7. The clutch of claim 6 wherein said yieldable means includes diametrically oppositely disposed springs operatively connecting said housing with said pump unit.

8. The clutch of claim 6 wherein said yieldable means includes diametrically oppositely disposed springs operatively connecting said housing with said pump unit and shiftable weights cooperating with said springs substantially as described.

9. The clutch of claim 6 wherein means are carried by said housing for cooling the same.

10. A clutch of the class described including a driving housing having a chamber and having means for coupling to a prime mover shaft; said housing having a removable cover plate provided with a central aperture; a driven shaft in part located in said housing chamber and in part passed through said cover aperture for connection to a load; said housing having an internal annular wall which includes two groups of three diametrically oppositely disposed projections separated by liquid circulating passages, the faces of said projections being curved on the same axis as that of said annular wall; a gear type pump unit mounted on said driven shaft in said chamber between said two groups of projections and having end faces curved to conform to the curvatures of the faces of said projections and having a pair of liquid circulating ports at each of said ends for cooperation with said projections and said liquid passages, said pump unit including a casing enclosing a master gear keyed to said driven shaft and two minor gears, said gears dividing said casing into four pump chambers each of which being connected with one of said liquid-circulating ports; and adjustable-tension means operatively connecting said housing with said casing at diametrically opposite places for purposes described, and hydraulic fluid within said housing and said casing.

11. A clutch of the class described including a driving housing having a chamber and having means for coupling to a prime mover shaft; said housing having a removable cover plate provided with a central aperture; a driven shaft in part located in said housing chamber and in part passed through said cover aperture for connection to a load; said housing having an internal annular wall which includes two groups of three diametrically oppositely disposed projections separated by liquid circulating passages, the faces of said projections being curved on the same axis as that of said annular wall; a gear type pump unit mounted on said driven shaft in said chamber between said two groups of projections and having end faces curved to conform to the curvature of the faces of said projections and having a pair of liquid circulating ports at each of said ends for cooperation with said projections and said liquid passages, said pump unit including a casing enclosing a master gear keyed to said driven shaft and two minor gears, said gears dividing said casing into four pump chambers each of which being connected with one of said liquid-circulating ports; a weight located at diametrically opposite places in said housing chamber and having a convex surface rockably engaging said internal annular wall of said housing; spring means continuously tending to hold said weights in contact with said housing wall; rods at either side of said weights and engaging in recesses in the weights on which said weights may pivot when rocked a predetermined amount in either direction; and operative connections between said weights and said pump casing for purposes described; and a hydraulic fluid within said housing and said casing.

12. The clutch of claim 11 wherein said weights have passages in which the springs of said spring means are located, said spring means including tension adjusters and said housing having plugged apertures through which access to said tension adjusters may be had when desired.

13. The clutch of claim 11 wherein said housing has radial vanes; a shield over said housing vanes and the annular wall of the housing and being spaced from the walls of the housing to provide passages for cooling air, said shield having an air intake opening at the vane side of the housing.

LONNIE A. DICKENS.

REFERENCES CITED

The following references are of record in the file of this patent:

UNITED STATES PATENTS

| Number | Name | Date |
|---|---|---|
| 1,132,746 | Sundh | Mar. 23, 1915 |
| 1,688,852 | Christie | Oct. 23, 1928 |
| 2,174,344 | Sinderson | Sept. 26, 1939 |
| 2,262,626 | Thorne | Nov. 11, 1941 |